(12) United States Patent
Groe et al.

(10) Patent No.: US 6,480,700 B1
(45) Date of Patent: Nov. 12, 2002

(54) APPARATUS, AND ASSOCIATED METHOD, FOR OPERATING A COMMUNICATION DEVICE AT REDUCED LEVEL OF CURRENT CONSUMPTION

(75) Inventors: John Groe, Poway, CA (US); Tom Kenny, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/518,515

(22) Filed: Mar. 3, 2000

(51) Int. Cl.$^7$ .............................................. H04B 7/00
(52) U.S. Cl. ..................... 455/69; 455/73; 455/522; 455/127; 330/278; 330/285
(58) Field of Search ................... 455/127, 522, 455/69, 73; 330/278, 285

(56) References Cited

U.S. PATENT DOCUMENTS 5,564,074 A * 10/1996 Juntti ......................... 455/67.1
5,923,215 A * 6/1999 Hans ........................... 330/149
6,049,704 A * 4/2000 Peckham et al. ........ 455/232.1

FOREIGN PATENT DOCUMENTS

WO    WO 99/30426    * 6/1999    ............ H04B/1/10

* cited by examiner

*Primary Examiner*—William Trost
*Assistant Examiner*—Danh C Le
(74) *Attorney, Agent, or Firm*—Milan I. Patel

(57) ABSTRACT

Apparatus, and an associated method, for selectably reducing the current consumption of a communication device, such as a mobile station operable in a cellular communication system. Portions of the communication device operated at desired power levels but at reduced current consumption levels, thereby to reduce power consumption of the communication device. When the communication device powered by a portable power supply, the longevity of the portable power supply is increased, as lessened amounts of power are required to operate the communication device.

20 Claims, 5 Drawing Sheets

APPARATUS, AND ASSOCIATED METHOD, FOR OPERATING A COMMUNICATION DEVICE AT REDUCED LEVEL OF CURRENT CONSUMPTION

The present invention relates generally to a manner by which to reduce current consumption during operation of a communication device, such as a cellular mobile station powered by a portable power supply. More particularly, the present invention relates to apparatus, and an associated method, by which to operate portions of the cellular mobile station, or other communication device, at a desired power level, but at reduced current consumption levels, thereby to reduce power consumption of the device and increase longevity of the portable power supply thereof.

BACKGROUND OF THE INVENTION

Advancements in communication technologies have permitted the implementation, and popular usage, of multi-user radio communication systems. A cellular communication system is exemplary of such a radio communication system. Information signals generated during operation of a radio communication system are transmitted upon radio communication channels.

To convert the information signal into a form to permit its communication upon a communication channel defined in a radio communication system, a transmitting station modulates the information signal upon a carrier wave of a carrier frequency within the range of frequencies which defines, at least in part, the communication channel. Thereby, a baseband-level signal of which the information signal is formed is converted into a radio frequency signal corresponding to the frequency of the communication channel upon which the resultant, communication signal is to be transmitted to a receiving station.

A transmitter of which the transmitting station is formed includes one or more up-mixing stages at which the baseband, information signal is up-converted in frequency to be of the selected radio frequency. The mixing stages include mixer circuits coupled to receive the information signal and an up-mixing signal with which the information signal is to be multiplied or otherwise combined to form an up-converted signal. When multiple mixing stages are utilized, an IF (intermediate frequency) signal is formed at a first, or first series, of the mixer stages. A radio frequency signal is formed at the final mixing stage.

The receiving station which receives a radio-frequency, communication signal transmitted thereto upon the radio communication channel must, analogously, convert the radio frequency signal to a baseband level. One or more down-conversion stages is utilized to down-convert the radio frequency signal to a baseband-level. Typically, an antenna transducer converts the radio-frequency communication signal transmitted upon the communication channel into electrical form. When initially converted into electrical form, the signal is of small amplitude. Amplifier elements forming a portion of the receiver of the receiving station amplify the received signal. Because of the amplification of the received signal, during down-conversion, such as at an IF stage of the receiver, the elements of the receiver must exhibit highly linear characteristics to ensure proper operation of the receiver.

A mobile station is used by a subscriber to a cellular communication system and is used to communicate therethrough. A mobile station is a radio transceiver having a transmitter portion and a receiver portion, together housed in a housing permitting carriage by the subscriber. A portable power supply is typically attached to, or contained within, the housing of the mobile station. Radio communication with network infrastructure of the cellular communication system is provided by way of the mobile station without need for a wireline connection between the mobile station and the network infrastructure and without the need for connection of the mobile station to an external power supply.

However, because the mobile station is powered by a portable power supply, the time period during which the mobile station is operable is limited by the storage capacity of the portable power supply. When energy stored at the portable power supply is depleted, continued operation of the mobile station is not permitted without replacement, or recharging, of the portable power supply.

As the amount of energy required to power the mobile station is determinative of the operational period during which the mobile station can be utilized, any manner by which the level of power consumption required to operate the mobile station can be reduced would increase the time period during which the mobile station can be powered by the portable power supply.

If a manner could be provided by which to reduce the power consumption requirements of the mobile station, increased longevity of a portable power supply used to power the mobile station would be permitted.

It is in light of this background information related to portable communication devices that the significant improvements of the present invention have evolved.

SUMMARY OF THE INVENTION

The present invention, accordingly, advantageously provides a manner by which to reduce current consumption during operation of a cellular mobile station, or other communication device. Through operation of an embodiment of the present invention, longevity of a portable power supply used to power the communication device is increased as a result of the reduced current consumption, and corresponding power consumption, requirements of the circuitry of the communication device. By increasing the amount of time by which the portable power supply is able to power the communication device prior to replacement, or recharging, thereof, improved convenience of use by a user of the communication device is permitted.

In one aspect of the present invention, a manner is provided by which to reduce the level of current required to operate the transmit portion of the communication device. The transmit portion, in one implementation, includes a power amplifier operable to amplify a transmit signal to permit transmission of the transmit signal to the network infrastructure of the communication system. Such a power amplifier is biased by a bias current. Generally, the power amplifier is constructed in a manner such that minimum performance requirements required thereof are met at a maximum output power level of the transmit signal, once amplified by the power amplifier. At the maximum output power level, the power level is self-biased. That is to say, the power level of the transmit signal applied to the power amplifier, together with the construction of the amplifier, sets the quiescent operating point thereof. When the power level of the transmit signal applied to the power amplifier is reduced beneath a threshold level, the power amplifier no longer remains self-biased. Instead, the power amplifier becomes biased by the biasing current applied thereto, and the gain of the power amplifier, and the transmit signal amplified thereat, is controlled by the level of the biasing current. Advantageous use of the operation of the power amplifier is made to control current consumption of the power amplifier as the biasing current applied to the power amplifier can be reduced without affecting the output power level of the transmit signal, once amplified, when the amplifier is self-biased to be operable in a self-biased mode.

In another aspect of the present invention, the transmit portion of the communication device further includes a power amplifier driver operable at a high, fixed current level. The driver includes a feedback pack which provides linearity performance of a desired level to the power amplifier driver. The gain of the amplifier driver is fixed, and the linearity of the amplifier driver is tied to a biasing current applied thereto. As the output power level of a signal amplified by the amplifier driver decreases, the bias current can be reduced, also to reduce current consumption of the transmit portion of the communication device.

In another aspect of the present invention, the transmit portion of the communication device also includes a RF (radio frequency) mixer. The RF mixer exhibits a characteristic gain in linearity. The gain in linearity of the RF mixer are of levels responsive to a bias current applied to the RF mixer. By appropriate alteration of the level of the biasing current applied to the RF mixer, the current consumption of the mixer is alterable and the gain of the RF mixer is correspondingly alterable. Lowering the level of the biasing current applied to the RF mixer reduces the current consumption, and corresponding power consumption, of the mixer.

In one implementation, an embodiment of the present invention is operable in the transmit portion of a cellular mobile station. The transmit portion includes an RF mixer, a power amplifier driver, and a power amplifier. At high power levels, such elements are biased for maximum linearity. As the output power level required of an output signal generated by the transmit portion is reduced, the gain of the RF mixer is reduced. Correspondingly, the biasing current applied to the power amplifier driver is reduced as the output power level is reduced. Eventually, the power amplifier is no longer self-biased, and the gain of the power amplifier becomes tied to the biasing current applied thereto.

In another aspect of the present invention, a manner is provided to selectably reduce the current consumption of the receive portion of a communication device. By reducing the current consumption of the receive portion of the communication device, the power consumption of the device correspondingly is reduced. When the communication device is powered by a portable power supply, reduction in the power consumption of the device increases the longevity of the portable power supply as the dissipation of the stored energy of the portable power supply is also reduced.

In one implementation, the receive portion of the communication device includes a Low Noise Amplifier (LNA). The low noise amplifier is selectably biased by a biasing current. Determinations are made of a signal-to-noise ratio of a receive signal received at the receive portion of the communication device. If the ratio is greater than a selected threshold, the low noise amplifier need not be utilized to amplify the receive signal. And, the biasing current is not applied to the low noise amplifier. If, conversely, the signal-to-noise ratio is less than the threshold, the low noise amplifier is biased with the bias current, thereby to amplify the receive signal. Through operation of such an embodiment of the present invention, current consumption of the receive portion of the communication device is selectably reduced when the signal-to-noise ratio of the receive signal is greater than the selected threshold.

In these and other aspects, therefore, apparatus, and an associated method, is provided for a radio device operable in a radio communication system to communicate radio frequency communication signals. The radio device is operated at selected radio characteristics. A first amplifier element is coupled to receive a first radio frequency signal. The first amplifier is biased by a first-bias current signal of a first selectable biasing level. The first amplifier element generates a first amplified radio frequency signal exhibiting a first level of linearity wherein the first level of linearity is responsive to the first-bias current signal. A second amplifier element is coupled to receive indications of the first amplified radio frequency signal generated by the first amplifier element. The second amplifier element is selectably operable in a large signal mode and in a small signal mode. The second amplifier element is operated in the large signal mode when the indications of the first amplified radio frequency signal applied thereto is at least as great as a threshold value such that, when operated in the large signal mode, the second amplifier element becomes self-biased at fixed gain level.

A more complete appreciation of the present invention and the scope thereof can be obtained from the accompanying drawings which are briefly summarized below, the following detailed description of the presently-preferred embodiments of the present invention, and the appended claims.

DETAILED DESCRIPTION OF THE PREFERRED EMBODIMENT

Figure 1:
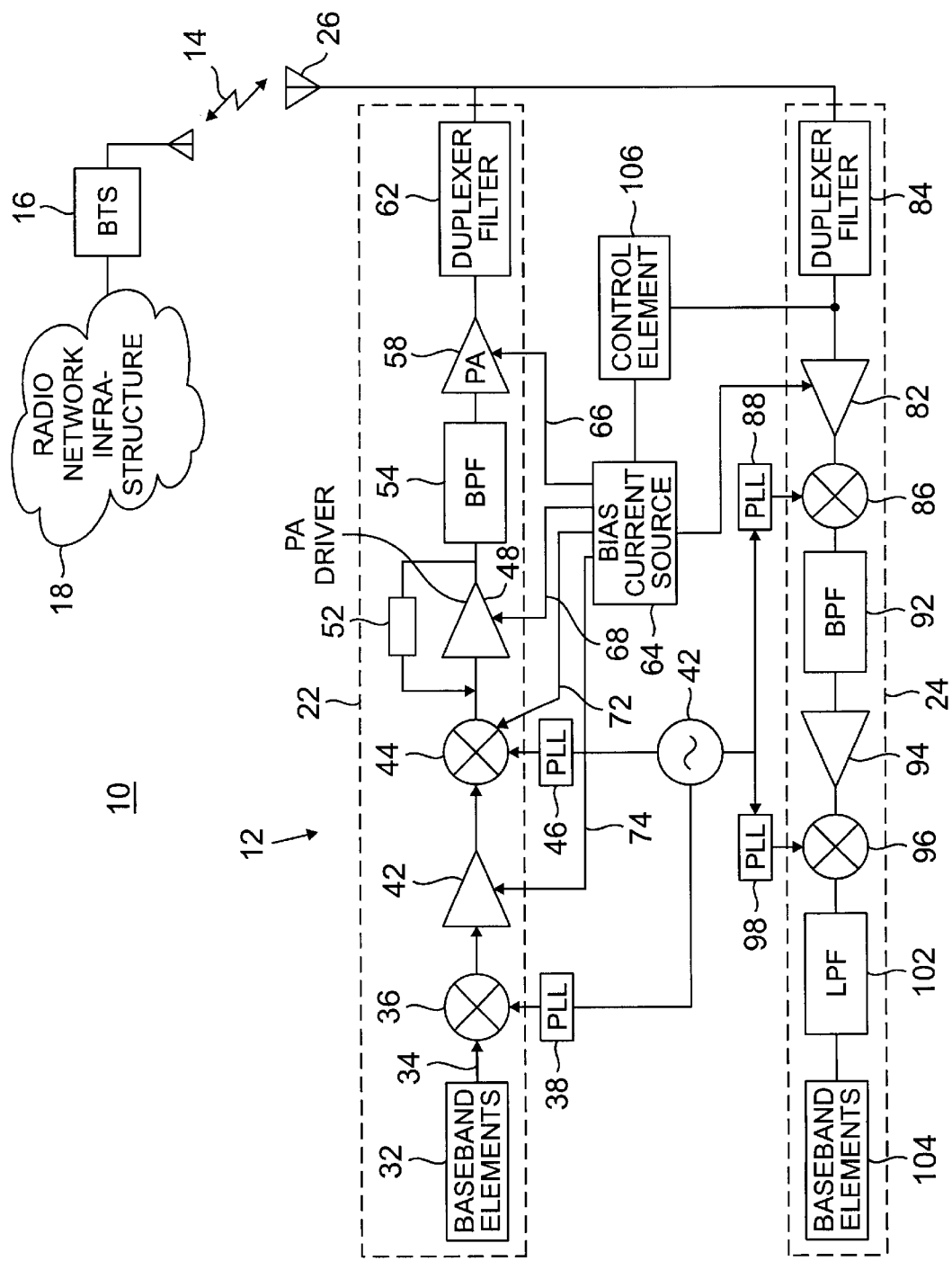
FIG. 1 illustrates a functional block diagram of a communication system in which a mobile station operable pursuant to an embodiment of the present invention forms a portion.

Referring first to FIG. 1, a portion of a cellular communication system, shown generally at 10, is installed throughout a geographical area. Cellular communication system 10 permits telephonic communications between network infrastructure of the communication system and a mobile station, of which the mobile station 12 is exemplary. The mobile station 12, furthermore, is exemplary of a communication device or, more generally, of an electronic circuit containing circuit elements which are biased by biasing currents. Accordingly, while the following description shall be described with respect to the exemplary implementation in which the mobile station 12 is operable in the cellular communication system 10, the teachings of the present invention are analogously applicable in other communication devices and other electronic circuits.

The mobile station 12 is operable to transceive radio communication signals communicated upon a radio link 14 with a base transceiver station 16 which is coupled to radio network infrastructure 18 of the cellular communication system, and of which the base transceiver station 16 forms a portion.

More particularly, the mobile station 12 includes a transmit portion 22 operable to generate uplink signals for communication to the base transceiver station 16 by way of the radio link 14. And, the mobile station also includes a receive portion 24 operable to detect, and operate upon, downlink signals generated by the base transceiver station 16 and communicated upon the radio link 14 to the mobile station. An antenna transducer 26 is coupled to both the transmit and receive portions 22 and 24 of the mobile station and is operable to transduce into, and out of, electromagnetic form, the communication signals communicated upon the radio link 14. The transmit and receive portions of the mobile station are powered by energy stored at a portable power supply 28 to which the portions 22 and 24 are electrically coupled. Due to the powering of the mobile station by the stored energy stored at the portable power supply, the operational period during which the mobile station is operable to transceive the communication signals is limited by the availability of the energy stored at the portable power supply. The operational period of the mobile station is therefore dependent upon the storage capacity of the power supply and the rate at which the stored energy must be dissipated to power the mobile station. Operation of an embodiment of the present invention provides a manner by which to increase the longevity of the portable power supply, i.e., the time period during which the portable power supply can power the mobile station, by reducing the power consumption of the portions 22 and 24 of the mobile station.

The transmit portion 22 of the mobile station is here shown to include baseband element 32 operable to generate a baseband-level transmit signal on the line 34 which is provided to a first input of a first mixer 36. The first mixer 36 is further coupled to receive an up-mixing signal at a second input thereof. The up-mixing signal is generated by a PLL (Phase Locked Loop) element 38 which is maintained in a frequency relationship with a local oscillator 42. A first up-mixed signal generated by the first mixer 36 is provided to an amplifier element 42, here an IFVGA (Intermediate-Frequency, Variable Gain Amplifier). The amplifier 42 generates an amplified signal which is provided to a first input of a second mixer 44. A second up-mixing signal is provided to a second input of the mixer 44, here generated by a PLL element 46. The PLL element 46 is also maintained in a frequency relationship with the local oscillator 42.

The mixer 44 forms a RF mixer for generating a second up-mixed signal of a radio frequency which is applied to an amplifier 48, here forming a power amplifier driver. The power amplifier driver exhibits a fixed amount of gain and exhibits a level of linearity dependent upon the construction of the amplifier. In conventional manner, the amplifier 48 includes a feedback element, typically a source or emitter degeneration element 52 which operates to provide a selected level of linearity.

An amplified signal generated by the amplifier 48 is provided to a band pass filter 54 to be filtered thereat and, thereafter, to a power amplifier 58. The power amplifier amplifies the transmit signal applied thereto to a transmit power level to permit transmission of the signal upon the radio link 14 to the base transceiver station 16. The amplifier 58 is coupled to the antenna transducer 26 by way of a duplexer filter element 62.

The elements of the transmit portion 22 of the mobile station are biased by biasing currents generated by a bias current source 64. And, as illustrated, a biasing current is applied to the power amplifier 58 by way of the line 66; a biasing current is provided to the power amplifier driver 48 by way of the line 68; a biasing current is applied to the mixer 44 by way of the line 72; and a biasing current is provided to the IF VGA 42 by way of the line 74.

The receive portion 24 of the mobile station includes a Low Noise Amplifier (LNA) 82 coupled to the antenna transducer 26 by way of a duplexer filter portion 84. The amplifier 82, in turn, is coupled to a first input of a first down-mixer 86. A down-mixing signal generated by a PLL element 88 is coupled to a second input of the first down-mixer. The PLL element is also coupled to the local oscillator 42 to be maintained in a frequency relationship therewith.

The first down-mixer generates a first down-mixed signal which is filtered by a band pass filter 92 and, in turn, amplified by a variable amplifier 94. A signal generated by the amplifier 94 is provided to a first input of a second down-mixer 96. The second down-mixer is also coupled, at a second input thereof, to a PLL element 98. The PLL element generates a second down-mixing signal and is coupled to be maintained in a frequency relationship with the local oscillator 42. The second-down-mixer 96 generates a baseband signal which is filtered by a low pass filter 102 and then provided to baseband elements 104 whereat baseband operations are performed thereupon.

During operation of an embodiment of the present invention, advantageous use is made of the characteristics of elements of the transmit and receive portions of the mobile station.

With respect to the transmit portion 22, the elements thereof are constructed such that the transmit signal generated thereat exhibits at least minimum performance requirements. Typically, the transmit portion is constructed in a manner utilizing high levels of current consumption at the maximum output level at which the transmit portion is to be operable. Such selection is made as linearity of the transmit signal is a crucial performance characteristic. At operation at lower power levels, a wide design margin exists, low, as the performance of the power amplifier 58 of the transmit portion improves rapidly.

The power amplifier 58, for instance, is constructed to meet the minimum performance requirements required of the transmit portion at the maximum output power level of the transmit portion. At such high output level, the power amplifier 58 becomes self-biased. That is to say, the input power of the transmit signal applied to the power amplifier 58 and the construction of the power amplifier, including device geometries, sets the quiescent operating point of the power amplifier 58 together with the driver 48. For so long as the power amplifier is operated in a manner such that the amplifier remains self-biased, the gain of the amplifier remains fixed.

If the input power to the power amplifier 58 is reduced, e.g., to attempt to lower the transmit power level of the amplified transmit signal, the power amplifier eventually falls out of self-biasing. When self-biased, the power amplifier is herein referred to be as operating in a large-signal mode. When, however, the power amplifier falls out of the large-signal mode due to reduction in the power level of the signal applied thereto, the power amplifier, instead, enters into a small-signal mode in which the power amplifier is not self-biased. When in the small-signal mode, the biasing current applied to the power amplifier on the line 66 controls the gain of the power amplifier.

As a result, the current consumed to operate the power amplifier is dependent upon the power level of the input signal applied to the power amplifier as well as by the level of the biasing current applied to the amplifier. The biasing current thereby forms a control current, which can be reduce through the entire power control range, or, alternately, set to a selected level. Such possible operation is permitted and, effectively guaranteed, by the construction of the power amplifier and not the bias current. Through such operation, further, the lower output power performance of the power amplifier is well above minimum requirements, and, the lower RF gain possible through operation of the transmit portion in this manner eases noise for requirements.

Advantageous use of the characteristics of the power amplifier driver 48 is also made during operation of an embodiment of the present invention. The power amplifier driver 48 also runs at high-fixed current levels. And, the driver, as noted above, includes a feedback element 52 for providing linearity performance to the driver. As such, the gain of the amplifier driver is fixed, and the linearity of the driver is dependent upon the bias current applied thereto by way of the line 68. As the output power level of signals generated by the amplifier driver decreases, it becomes advantageous to lower the bias current of the biasing current applied thereto on the line 68.

Advantageous use is also made of the characteristics of the RF mixer 44. The gain of the mixer 44 and its linearity are dependent upon the bias current applied thereto by way of the line 72. Again, the current consumed by the RF mixer can be lowered, and the gain of the RF mixer, can be controlled by the level of the biasing current applied thereto.

Therefore, according to an embodiment of the present invention, several circuit elements of the transmit portion 22 are controlled to achieve a desired output power level of the transmit signal generated thereat while, at the same time, minimizing current consumption of the elements of the transmit portion. At a high power level, the amplifier 42, the RF mixer 44, the power amplifier driver 48, and the power amplifier 58 are all biased to achieve maximum linearity. As the output power level is reduced, the gain of the amplifier 42 and RF mixer 44 are also reduced. At the same time, the bias current applied to the power amplifier 58 by way of the line 66 is also reduced, as the output power level is falling, while the gain of the amplifier 58 remains fixed. Eventually, the power amplifier 58 falls out of the large-signal, self-biased mode, and the gain of the amplifier 58 becomes dependent upon the level of the biasing current applied thereto. While separate lines are shown extending from the biasing current source 64 to provide bias currents to the various elements of the transmit portion 22, such lines, in one implementation, are ganged together and fixed at a low level. In either implementation, however, the gain of the entire transmitter portion and, thus, the output power level thereof continues to decrease.

Further benefits results as factory calibration can be utilized to define at least the output power levels, and the output power in linearity requirements are known to control elements of the mobile station. Therefore, in a straightforward manner, the gain and the biasing currents are controllable for each of the elements of the transmit portion. Such an approach reduces current consumption and, in turn, increases longevity of the operational period of the portable power supply used to power the mobile station.

Figure 2:
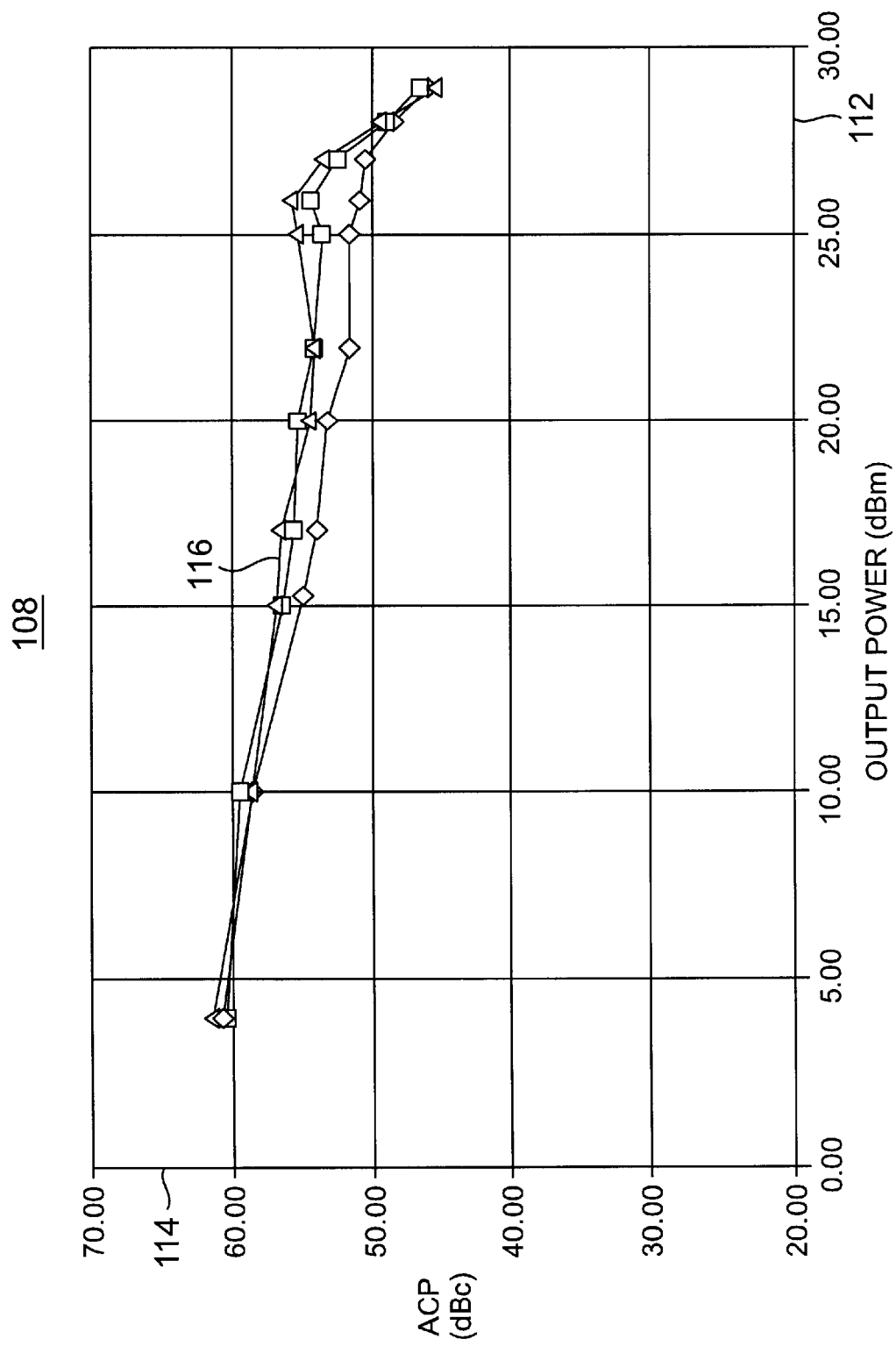
FIG. 2 illustrates a graphical representation showing the small signal performance of the power amplifier forming a portion of the transmit portion of the mobile station shown in FIG. 1.

FIG. 2 illustrates a graphical representation, shown generally at 108, in which the large-signal performance of the power amplifier is plotted. Output power, scaled in terms of dBm, is indicated along the abscissa axis 112, and values of acp, scaled in terms dBc, is defined along the ordinate axis 114. The resultant plot 116 indicates, at high levels of output power the level of acp improves rapidly.

Figure 3:
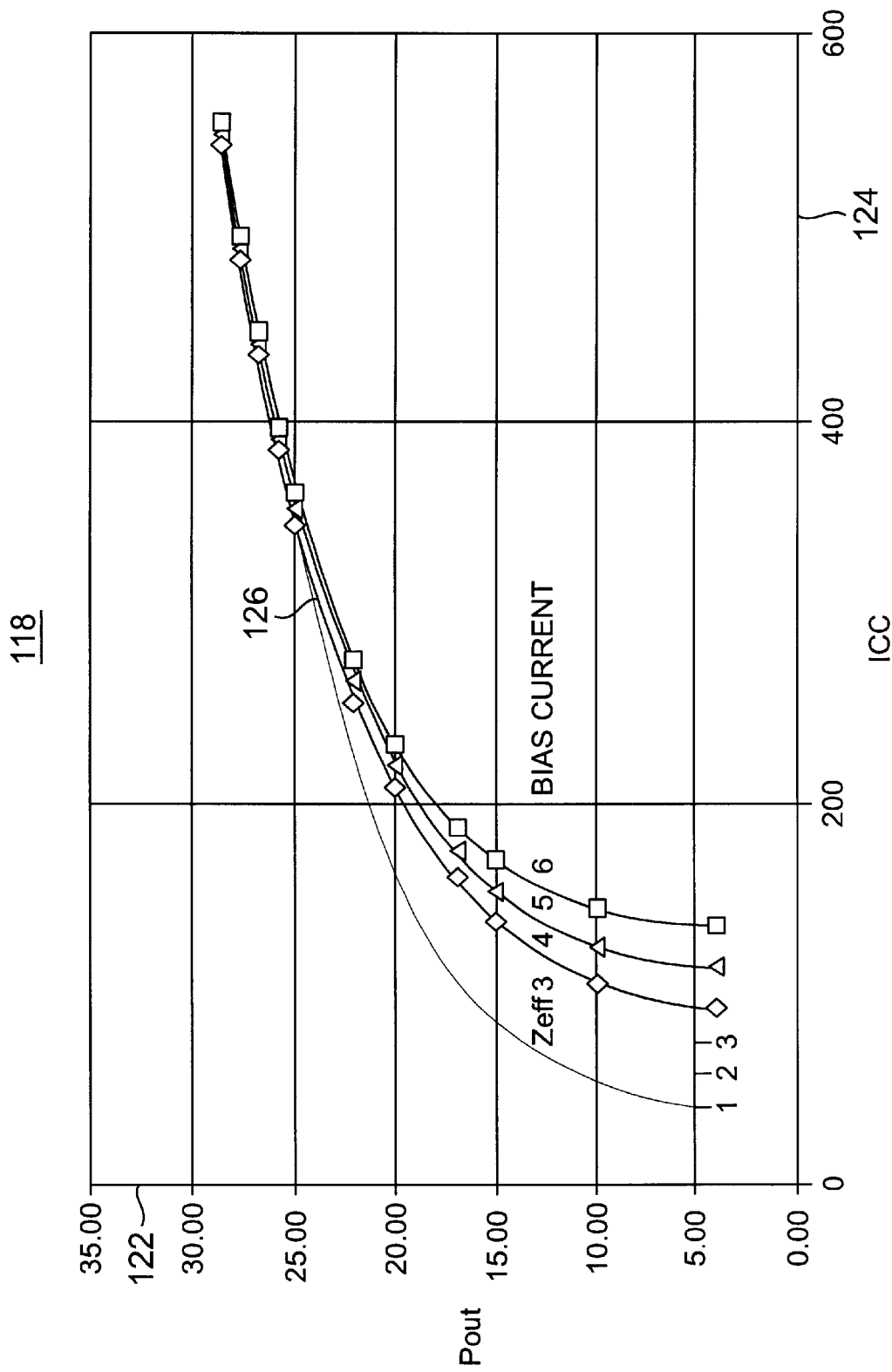
FIG. 3 illustrates another graphical representation, here of the large signal performance of the power amplifier forming a portion of the transmit portion of the mobile station shown in FIG. 1.

FIG. 3 illustrates a graphical representation, shown generally at 118, in which the power output, scaled along the ordinate axis 112, is plotted as a function of current Icc 124. The resultant plot 126 indicates that the amplifier becomes self-biased, viz., generates essentially the same output power levels independent of the value of the biasing current.

Figure 4:
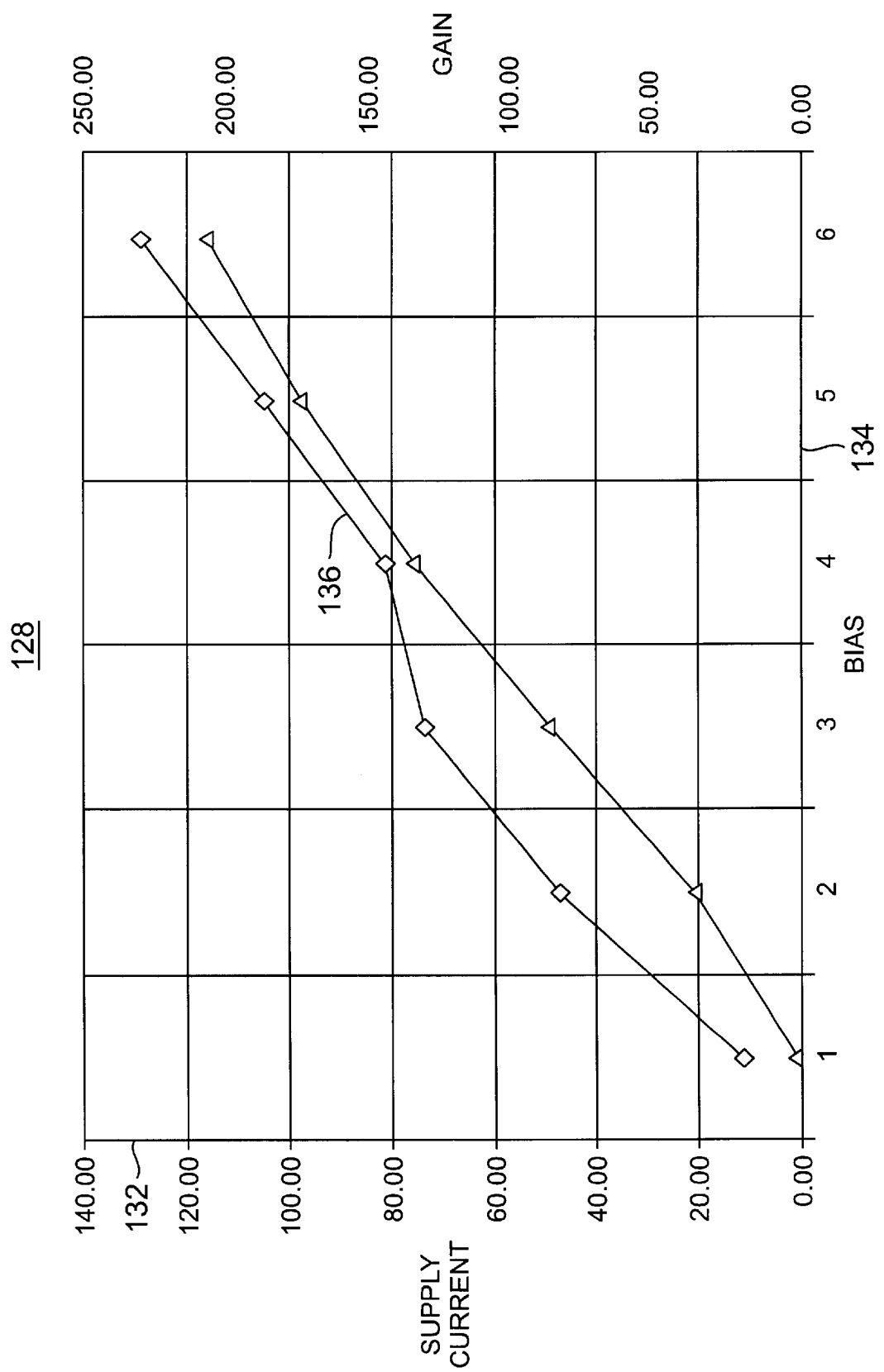
FIG. 4 illustrates a graphical representation showing the relationship between the output power of a signal amplified by the power amplifier forming a portion of the transmit portion of the mobile station shown in FIG. 1 as a function of biasing current.

FIG. 4 illustrates a graphical representation, shown generally at 128, showing the small-signal performance of the power amplifier. Here, the supply current is scaled along the ordinate axis 132 as a function of the biasing current, scaled along the abscissa axis 134. The resultant plot is indicated by the curve 136 in which a direct relationship is shown herebetween.

Advantageous use is also made of the characteristics of the low-noise amplifier 82 of the receive portion 24 of the mobile station. Operation of an embodiment of the present invention determines characteristics of the receive signal received at the mobile station. Determine characteristics of the receive signal are utilized to select whether to bias the amplifier 82 with a biasing current, either to turn the amplifier on to amplify signals provided thereto, or not to power the amplifier so that the signals are not amplified when applied thereto.

Figure 5:
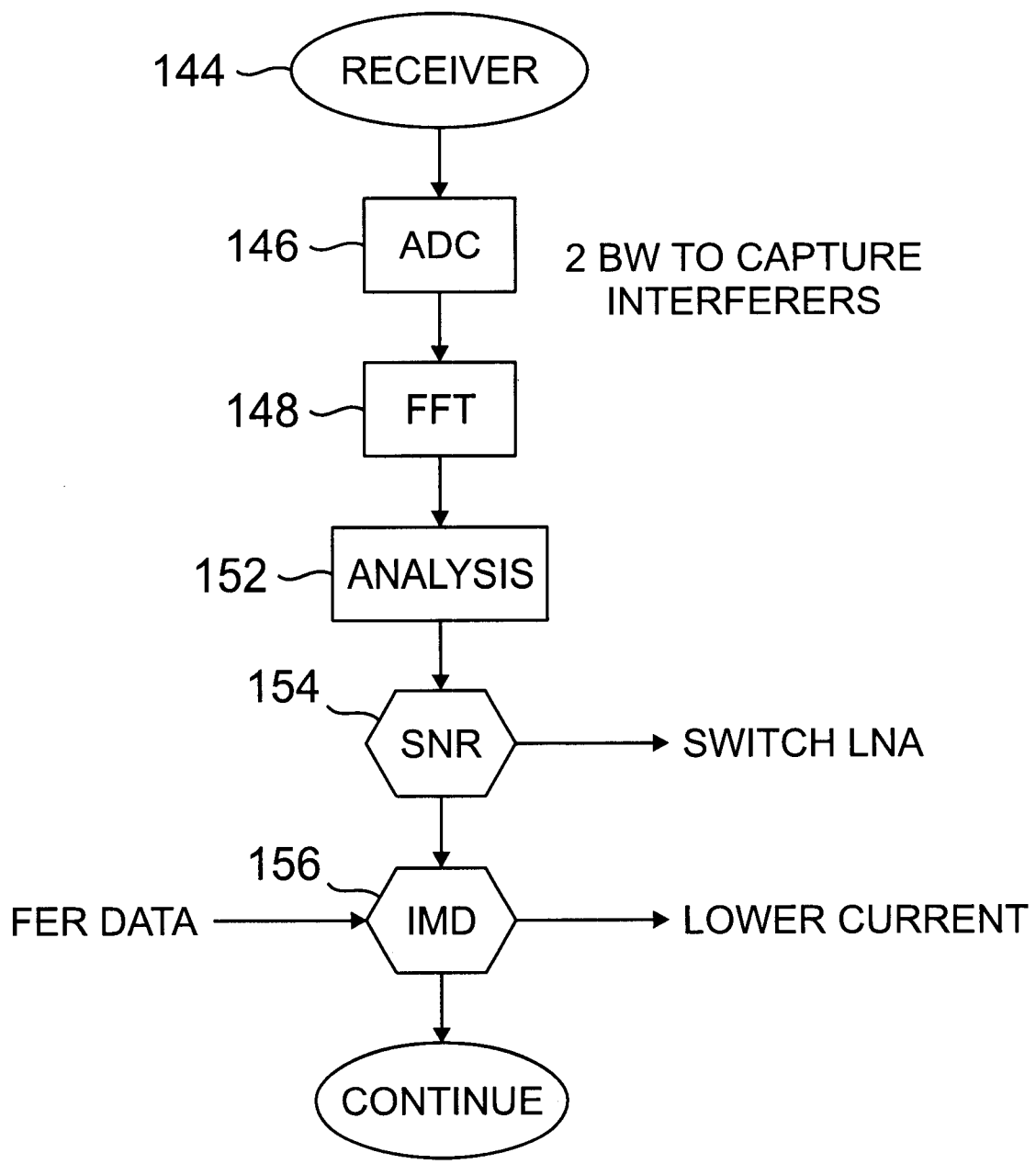
FIG. 5 illustrates a method flow diagram listing the method of operation of an embodiment of the present invention by which selectably to power a low noise amplifier forming a portion of the receive portion of the mobile station shown in FIG. 1.

FIG. 5 illustrates a method flow diagram, shown generally at 142, illustrating operation of such an embodiment of the present invention. The functions carried out by the method 142 are performed, for instance, at the control element 106 of the mobile station.

First, and as indicated by the block 144, the receive signal is detected at the receive portion of the mobile station. Analog-to-digital conversion is performed, as indicated by the block 146, and a Fast Fourier Transform (FFT) is performed, as indicated by the block 148. The FFT routine measures in-channel intermodulation products of the receive signal, and the results thereof are determined, as indicated by the analysis block 152. A determination is made, as indicated by the decision block 154, as whether or not to bias the amplifier 82. A determination is also indicated at the block 156 as to whether to lower the current applied to the amplifier, once the amplifier is turned on.

Operations performed at the various elements of the method 142 are performed a bandwidth which also the adjacent channel, adjacent to the channel containing the intended receive signal. As a result, any nearby interfering signal is captured and processed upon. Interfering signals outside of the adjacent channel are, in contrast, greatly attenuated by filter elements of the receive portion and do not significantly impact upon the performance of the method 142.

A receive energy spectrum is found responsive to the FFT operations and indicates the frequency location of interfering signals. The received energy spectrum determined thereby also indicates the RMS (Route Mean Square) strength of such signals back an earlier point in time but not the current strength of such signals. In practice, this is satisfactory because the RMS value typically nearly equals the up-fade value of the signal.

If the received energy spectrum is known, or bounded, then the receive portion can be adapted to optimally receive it.

Generally, the method 142, therefore, processes the receive signal received at the receive portion to yield the received energy spectrum thereof. From this, the SNR (Signal-to-Noise Ratio) is computed using the adjacent channel power minus interfering signals. If the level of the SNR is high enough, the front-end NA too can be switched-off, and current consumption reduced. If not, the amplifier utilized to amplify the receive signal. Performance of the FFT also reveals if any intermodulation products have been generated and the potential for such products to be generated, by resolving nearby interfering signals. Based on this information and the FER, the bias current of the amplifier 82 and the mixer 86 are adjusted to provide a sufficient SIR margin.

Values of the FFT are re-computed for each frame of the receive signal and analyzed for interfering signals. Also, changes in values of the FER trigger further analysis of the interfering signals and intermodulation products. The algorithm is preferably fast attack-slow decay, meaning that it slowing ratchets down the current consumption for low interfering signals and ramps up the current consumption quickly to handle large signals.

Thereby, through operation of this additional embodiment of the present invention, additional current consumption required to operate the receive portion of the mobile station is selectably reduced. Thereby, improvements in the longevity of the portable power supply of the mobile station can result.

The previous descriptions are of preferred examples for implementing the invention, and the scope of the invention should not necessarily be limited by this description. Therefore, the present invention is defined by the following claims.

We claim:

1. In a radio device operable in a radio communication system to communicate radio-frequency communication signals, an improvement of apparatus for operating the radio device at selected radio characteristics, said apparatus comprising:

a first amplifier element coupled to receive a first radio frequency signal, said first amplifier based by a first-bias current signal of a first selectable biasing level, said first amplifier element generating a first amplified radio frequency signal exhibiting a first level of linearity, the first level of linearity responsive to the first-bias current signal; and a second amplifier element coupled to receive indications of the first amplified radio frequency signal generated by said first amplifier element, said second amplifier element selectably operable in a large-signal mode and in a small signal mode, said second amplifier operated in the large-signal mode when the indications of the first amplified radio frequency signal applied thereto is at least as great as a threshold value such that, when operated in the large-signal mode, said second amplifier become self-biased at a fixed gain level.

2. The apparatus of claim 1 wherein, when the indications of the first amplified radio signal applied to said second amplifier element is less than the threshold value, said second amplifier becomes operated in the small-signal mode.

3. The apparatus of claim 2 wherein said second amplifier element is biased by a second-bias current signal of a second selectable biasing level such that, when operated in the small-signal mode, said second amplifier element amplifies the first amplified radio frequency signal at a gain level responsive to levels of the second-bias current signal.

4. The apparatus of claim 3 wherein the gain level at which said second amplifier element amplifies the first amplified radio frequency signal is proportional to the levels of the second-bias current signal when said second amplifier element is operated in the small-signal mode.

5. The apparatus of claim 3 further comprising a second-bias current signal generator, said second-bias current signal generator for generating the second-bias current signal applied to said second amplifier element.

6. The apparatus of claim 1 further comprising a first-bias current signal generator, said first-bias current signal generator for generating the first-bias current signal applied to said first amplifier element.

7. The apparatus of claim 1 further comprising an RF mixer, said RF mixer coupled to receive an input signal and for forming the first radio frequency signal responsive thereto, said RF mixer coupled to receive an RF-mixer biasing signal, the first radio frequency signal exhibiting a second level of linearity, the second level of linearity responsive to the RF-mixer biasing signal.

8. The apparatus of claim 7 wherein said RF mixer further has an RF-mixer gain associated therewith and by which the input signal is amplified during formation of the first radio frequency signal, the RF-mixer gain of a level responsive to levels of the RF-mixer biasing signal.

9. The apparatus of claim 8 further comprising an RF-mixer biasing signal generator, said RF-mixer biasing signal generator for generating the RF-mixer biasing signal.

10. The apparatus of claim 1 wherein the radio device comprises a mobile transceiver having a transmit portion and wherein said first amplifier element and said second amplifier element forming portions of the transmit portion.

11. The apparatus of claim 10 wherein the mobile transceiver further comprises a receive portion, the receive portion including a receive-circuit amplifier and wherein the apparatus further comprises:

a received energy determiner coupled to receive indications of a receive signal received at the receive portion of the mobile transceiver, said received energy determiner for determining energy levels at the receive signal;

a signal-to-noise ratio calculator coupled to said received energy determiner, said signal-to-noise ratio calculator for calculating a value representative of a signal-to-noise ratio of the receive signal; and a selector coupled to said signal-to-noise ratio calculator, said selector for selecting whether to power the receive-circuit amplifier responsive to calculations of the value of the signal-to-noise ratio by said signal-to-noise calculator.

12. The apparatus of claim 11 wherein the indications of the receive signal to which said received energy determiner is coupled to receive includes a selected channel together with an adjacent channel.

13. The apparatus of claim 12 wherein said received energy determiner comprises an FFT (faster fourier transform) calculator for performing FFT calculations upon the indications of the receive signals, the FFT calculations indicating interfering signal—and desired signal—component portions of the receive signal.

14. The apparatus of claim 13 wherein the value representative of the signal-to-noise ratio calculated by said signal-to-noise ratio calculator is calculated utilizing interfering signal-component portions calculated pursuant to the FFT calculations.

15. The apparatus of claim 14 wherein said selector selects to power the receive-circuit amplifier when the value of the signal-to-noise ratio is less than a selected threshold value.

16. In a method for communicating with a radio device operable in a radio communication system to communicate radio-frequency communication signals, an improvement of a method for operating the radio device at selected radio characteristics, said method comprising:

providing a first radio frequency signal to a first amplifier element biased by a first-bias current signal of a first selectable biasing level;

generating a first amplified radio frequency signal exhibiting a first level of linearity, the first level of linearity responsive to the first-bias current signal; and providing indications of the first amplified radio frequency signal to a second amplifier element selectably operable in a large-signal mode and in a small-signal mode, the second amplifier operated in the large-signal mode when the indications of the first amplified radio frequency signal applied thereto is at least as great as a threshold value such that, when operated in the large-signal mode, the second amplifier becomes self-biased at a fixed gain level.

17. The method of claim 16 comprising the additional operations of:

selecting the first selectable biasing level at which to bias the first amplifier element; and selecting in which of the large-signal mode and the small-signal mode in which to operate the second amplifier element.

18. The method of claim 17 wherein said operation of selecting in which of the large-signal mode and the small-signal mode to operate the second amplifier element is made responsive to values of the first amplified radio frequency signal.

19. The method of claim 18 wherein the radio device comprises a mobile transceiver having a transmit portion and a receive portion, wherein the first amplifier element and the second amplifier element form portions of the transmit portion, and wherein said operation providing the first radio frequency signal provides a send signal to the first amplifier element.

20. The method of claim 19 wherein the receive portion further comprises a receive-circuit amplifier and wherein said method further comprises the operation of:

selecting whether to bias the receive-circuit amplifier.

* * * * *